CHARLES F. SPENCER.

Improvement in Dredge Boxes.

No. 120,339.                    Patented Oct. 24, 1871.

WITNESSES:
Parker H. Sweet, Jr.
Wm. J. Peyton.

INVENTOR:
Chas. F. Spencer
By James L. Norris
Atty.

UNITED STATES PATENT OFFICE.

CHARLES F. SPENCER, OF CLEVELAND, OHIO.

IMPROVEMENT IN DREDGE-BOXES.

Specification forming part of Letters Patent No. 120,339, dated October 24, 1871.

*To all whom it may concern:*

Be it known that I, CHARLES F. SPENCER, of Cleveland, in the county of Cuyahoga and State of Ohio, have invented new and useful Improvements in Dredge-Boxes, of which the following is a specification:

This invention relates to certain improvements in that class of articles known as dredging-boxes—that is, boxes or receptacles designed for receiving, holding, and scattering spices, flour, and other pulverized material.

To produce a receptacle or box adapted for the purpose of containing and transporting safely pulverized spice and like material, and at the same time furnish to the consumer a neat, cheap, and effective dredging-box—one that can be used as a dredge, and will permit of the top being readily removed without disfiguring the label or altering its appearance—is the object of my invention.

Figure 1:
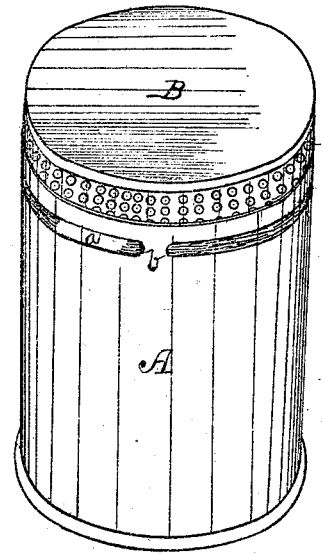
Figure 2:
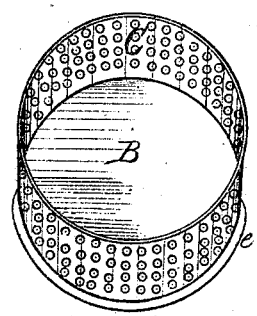
Figure 3:
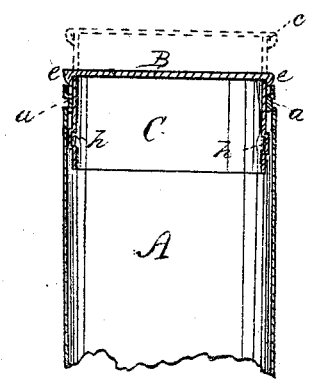

In the accompanying drawing, Figure 1 is a perspective view of the improved dredging-box, showing the lid with the perforated rim moved outwardly, as when dredging. Fig. 2 is a detached view of the lid and perforated rim. Fig. 3 is a longitudinal central section of the lid and perforated rim, and the body of the box.

My invention consists in attaching to the cover or lid of the box designed for dredging or scattering spice or other material a perforated rim provided with a lug or projection, the diameter of which rim is less than the diameter of the body of the box, the two being combined and operating together in such a manner that the rim of the lid can be moved out and in, so as to permit or prevent the escape of the material contained in said box or receptacle, as will hereinafter be described.

In the drawing, A designates the body of the box; B, the lid; and C, the perforated rim. These parts may be made of any desired material, such as metal or wood, and in contour have a circular, oval, or square formation. The rib $a$, which is present in such boxes, but projects on the outer surface, is, in the present instance, formed so as to project upon the inside surface, and, in some instances, the said rib is slightly depressed or flattened, as at $b$, so as to permit of the easy passage of a projection on the rim of the lid, as will be mentioned hereinafter. B is the lid or cover of the dredge-box, upon which is firmly secured the rim C, which latter is provided with a series of small perforations. This rim C I design to produce from a sheet of thin metal, by perforating with suitable dies or punches; but in some instances I propose to employ wire-gauze, or netting, or some such suitable material. This perforated rim is preferably secured upon the lid or cover B, by simply giving a flaring edge, $c$, to the same, and placing it upon the surface of the lid B and bending the edge $e$ of the lid up over the same. By this means the two are firmly united together and soldering dispensed with.

By arranging this perforated rim directly upon the lid and making it of a diameter less than that of the body of the box, the rim is adapted to be moved in and out, so as to permit the escape of the pulverized material when used as a dredge, but when pressed into the box to cut off the escape of the material confined in the same.

When it is desired to remove a quantity of the material from the box, the lid and rim can readily be removed and replaced without injuring the label, and by the shoulder $f$, formed upon the lid at the junction of the rim, no minute particles can escape or work out.

This arrangement of the cover will be found most useful for culinary purposes, and as all means of escape for the pulverized material is cut off when the lid is in place, the box will be found to possess a special feature for transporting such substances for the market and consumer.

The surface of the rim C is provided with one or more slight projections, $h$, so as to correspond with and pass freely through the depressions $b$ of the body A, so that when the rim is moved in the projection $h$ will be below the rib $a$, and will permit the lid to turn and prevent the disengagement of the cover and rim unless the points $b$ and $h$ coincide.

Having thus described my invention, what I claim as new, and desire to secure by Letters Patent, is—

The body A having the internal bead $a$, in combination with the lid B having the perforated rim C provided with a stop or projection, $h$, as and for the purpose set forth.

To the above I have signed my name this 6th day of October, A. D. 1871.

CHAS. F. SPENCER.

Witnesses:
JAMES L. NORRIS,
WM. J. PEYTON.